US011632667B2

(12) United States Patent
Shariat et al.

(10) Patent No.: US 11,632,667 B2
(45) Date of Patent: Apr. 18, 2023

(54) METHOD AND APPARATUS FOR DATA ANALYTICS IN TELECOMMUNICATION NETWORK

(71) Applicant: Samsung Electronics Co., Ltd., Suwon-si (KR)

(72) Inventors: Mehrdad Shariat, Middlesex (GB); Jungshin Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 89 days.

(21) Appl. No.: 17/206,976

(22) Filed: Mar. 19, 2021

(65) Prior Publication Data

US 2021/0297843 A1 Sep. 23, 2021

(30) Foreign Application Priority Data

Mar. 20, 2020 (GB) ..................................... 2004073
Aug. 25, 2020 (GB) ..................................... 2013265
Mar. 12, 2021 (GB) ..................................... 2103460

(51) Int. Cl.
*H04W 4/00* (2018.01)
*G06F 15/173* (2006.01)
(Continued)

(52) U.S. Cl.
CPC ............. *H04W 8/005* (2013.01); *H04L 67/55* (2022.05); *H04W 4/06* (2013.01); *H04W 4/24* (2013.01)

(58) Field of Classification Search
CPC ......... H04W 8/005; H04W 4/06; H04W 4/24; H04L 67/55
(Continued)

(56) References Cited

U.S. PATENT DOCUMENTS

2019/0222489 A1* 7/2019 Shan ................. H04M 15/8033
2019/0394655 A1* 12/2019 Rahman .............. H04L 41/5058
2019/0394713 A1 12/2019 Zheng et al.
(Continued)

FOREIGN PATENT DOCUMENTS

CN 110677299 A 1/2020
KR 10-2020-0018343 A 2/2020

OTHER PUBLICATIONS

China Mobile et al., SA WG2 Meeting #136, S2-1912302, New Use Case: NWDAF-assisted Smart City, Nov. 22, 2019.
(Continued)

*Primary Examiner* — Mark G. Pannell
(74) *Attorney, Agent, or Firm* — Jefferson IP Law, LLP (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of managing analytics data in a telecommunication network is provided. The method includes a consumer Network Function, (NF), determines how analytics data from a plurality of individual sources is collected and analyzed in one of a) a distributed manner from a plurality of Network Data Analytics Functions (NWDAF), b) a centralized manner by aggregating analytics data from the plurality of NWDAFs, before analyzing it at an Aggregator NWDAF, or c) a mixture of a) and b) above.

9 Claims, 5 Drawing Sheets (51) Int. Cl.
*H04L 9/32* (2006.01)
*H04W 8/00* (2009.01)
*H04W 4/06* (2009.01)
*H04W 4/24* (2018.01)
*H04L 67/55* (2022.01)

(58) Field of Classification Search
USPC .......................................................... 370/329
See application file for complete search history.

(56) References Cited

U.S. PATENT DOCUMENTS

| | | | | |
|---|---|---|---|---|
| 2020/0196155 | A1* | 6/2020 | Bogineni | H04L 41/0823 |
| 2020/0228420 | A1* | 7/2020 | Dao | H04L 41/40 |
| 2020/0252813 | A1* | 8/2020 | Li | G06Q 20/382 |
| 2020/0288296 | A1* | 9/2020 | Fiorese | H04W 64/006 |
| 2020/0322775 | A1* | 10/2020 | Lee | H04W 8/02 |
| 2021/0045046 | A1* | 2/2021 | Mukherjee | H04W 4/029 |
| 2021/0144076 | A1* | 5/2021 | Lee | H04L 43/067 |
| 2021/0219179 | A1* | 7/2021 | Narath | H04W 28/08 |
| 2021/0351993 | A1* | 11/2021 | Puente Pestaña | H04L 41/046 |
| 2021/0367854 | A1* | 11/2021 | Lee | H04L 41/5058 |
| 2022/0053348 | A1* | 2/2022 | Singh | H04W 24/08 |
| 2022/0060388 | A1* | 2/2022 | Li | H04L 41/147 |
| 2022/0124015 | A1* | 4/2022 | Khare | H04L 43/06 |
| 2022/0150130 | A1* | 5/2022 | Kuai | H04L 41/147 |
| 2022/0150685 | A1* | 5/2022 | Chong | H04L 67/14 |
| 2022/0167211 | A1* | 5/2022 | Sharma | H04W 28/095 |
| 2022/0294606 | A1* | 9/2022 | Norrman | G06N 20/00 |

OTHER PUBLICATIONS

Ericsson et al., 3GPP TSG-SA/WG2 Meeting #137E, S2-2001850, SCP selection of another SCP, Feb. 18, 2020.
Huawei, 3GPP TSG-WG SA2 Meeting #137E e-meeting, S2-2002170, TS 23.288 editor's note handling, Feb. 18, 2020.
Nokia et al., SA WG2 Meeting #136, S2-1912272, Corrections to General and Framework Part of Analytics, Dec. 3, 2019.
Huawei et al., SA WG2 Meeting #136AH, S2-2001210, Solution to Multiple NWDAF Instances, Jan. 14, 2020.
International Search Report dated Jun. 28, 2021, issued in International Patent Application No. PCT/KR2021/003437.
European Search Report dated Jul. 9, 2021, issued in European Patent Application No. 21163792.1.
3GPP TS 23.288 V16.0.0, Architecture enhancements for 5G System (5GS) to support network data analytics services, Jun. 2019, Valbonne, France.
3GPP TR 23.700-91 V17.0.0, Study on enablers for network automation for the 5G System (5GS); Phase 2, 3GPP SA2 TR 23.700-91, Dec. 2020, Valbonne, France.
Ericsson, Solution on how to find an associated NWDAF, S2-2000167_Solution on how to find an associated NWDAF, 3GPP SA WG2 Meeting #136AH, Incheon, Korea, Jan. 13-17, 2020.
Great Britain Office Action dated Jan. 4, 2021, issued in Great Britain Patent Application No. GB2004073.9.
Great Britain Action dated Jul. 22, 2021, issued in Great Britain Patent Application No. GB2103460.8.

* cited by examiner

METHOD AND APPARATUS FOR DATA ANALYTICS IN TELECOMMUNICATION NETWORK

CROSS-REFERENCE TO RELATED APPLICATION(S)

This application is based on and claims priority under 35 U.S.C. § 119(a) of a United Kingdom patent application number 2004073.9, filed on Mar. 20, 2020, in the United Kingdom Intellectual Property Office, of a United Kingdom patent application number 2013265.0, filed on Aug. 25, 2020, in the United Kingdom Intellectual Property Office, and of a United Kingdom patent application number 2103460.8, filed on Mar. 12, 2021, in the United Kingdom Intellectual Property Office, the disclosure of each of which is incorporated by reference herein in its entirety.

BACKGROUND

1. Field

The disclosure relates to the acquisition, processing and use of data analytics in a telecommunication network. More particularly, the disclosure relates to Fifth Generation networks, although this is exemplary and other networks may benefit similarly.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

There is an increasing desire to improve network automation for 5G telecommunication networks, known as enabling Network Automation (eNA). As a part of this, Network Data Analytics Function (NWDAF) are defined as part of a Service Based Architecture (SBA) using mechanisms and interfaces specified for 5G Core and Operations Administration and Maintenance (OAM).

In a service-based architecture, each network function (NF) comprises a set of services that interfaces it (as the producer of such services) to other NFs (as the consumer of those services) over a common bus known as service-based interface (SBI).

Figure 1:
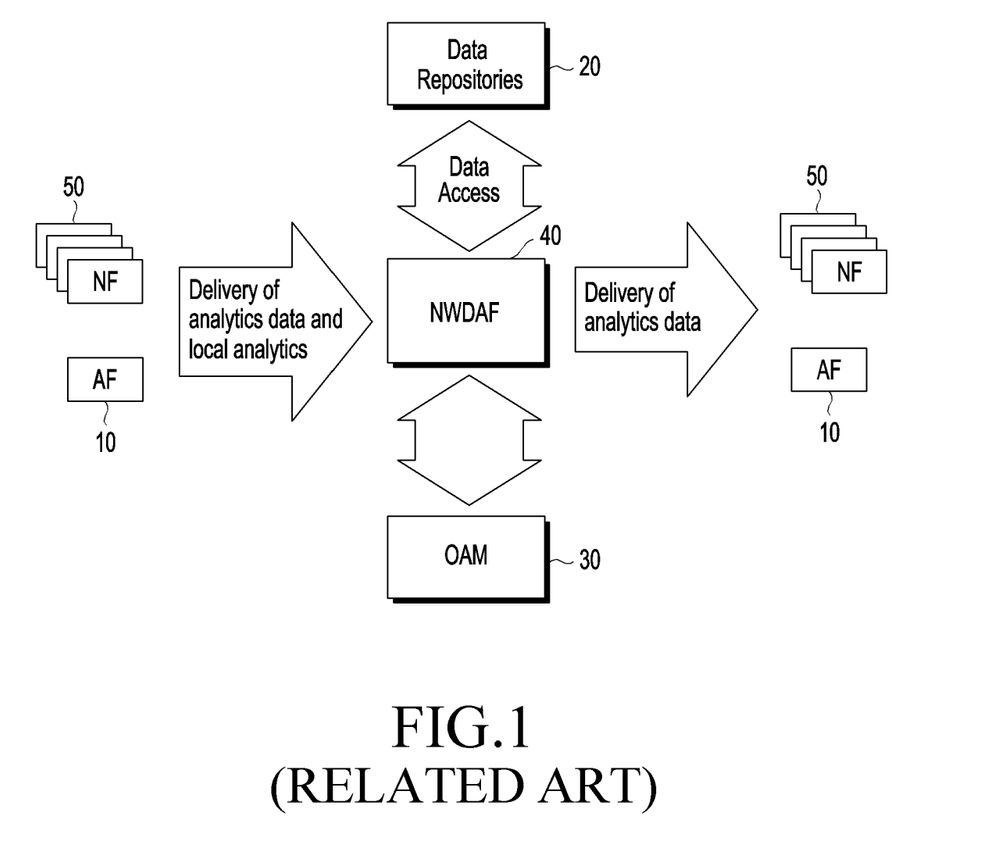
FIG. 1 illustrates a general representation of a 5G network automation framework according to the related art.

FIG. 1 illustrates a general schematic overview illustrating various element in a 5G network automation scheme according to the related art. Only those parts relevant of the automation are shown, for clarity. This shows that activity data and analytics are provided from a first group of NFs 50 or Application Functions (AFs) 10 to NWDAF 40. NWDAF 40 also interfaces to OAM 30 and data repositories 20. NWDAF 40 analyses the data from these sources and delivers analytics data to a second group of NFs 50 or AFs 10. The second group of NFs 50 may include some or all of the first group of NFs 50 or AFs 10.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of managing analytics data in a telecommunication network, wherein a consumer Network Function (NF), determining how analytics data from a plurality of individual sources is collected and analyzing the analytics data in one of a distributed manner from a plurality of Network Data Analytics Functions (NWDAF), a centralized manner by aggregating analytics data from the plurality of NWDAFs, before analyzing the analytic data at an Aggregator NWDAF, or at least one of each of the distributed manner from the plurality of NWDAFs and the centralized manner by the aggregating of the analytics data from the plurality of NWDAFs, before the analyzing the analytics data at an Aggregator NWDAF.

Additional aspects will be set forth in part in the description which follows and, in part, will be apparent from the description, or may be learned by practice of the presented embodiments.

In an embodiment, in the case of a plurality of NWDAFs being provided in the telecommunication network, at least one has a specialized function and at least one has a general function.

In an embodiment, the specialized function is to aggregate analytics from plurality of areas of interest or plurality of target users, and the general function is to notify analytics per area of interest or per set of target users.

In an embodiment, capability information of any particular one of the plurality of NWDAFs having the specialized function is stored in a Network Repository Function (NRF).

In an embodiment, the capability information relates to analytics aggregation capability In an embodiment, a consumer Network Function, NF, determines one or more NWDAFs from which to collect data, based on NWDAF capability information as part of its implemented internal selection criteria.

In an embodiment, implemented selection criteria comprises one or more of newly registered capabilities in NRF, determined based on the level of load per NWDAF, number of analytics Identifiers (IDs) directly supported per NWDAF and other Key Performance Indicators (KPIs) pre-configured by the network Operator.

In an embodiment, an identifier, such as aggregation point identifier, AP ID, is defined per Aggregator NWDAF, as an assistance information registered in NRF wherein the identifier indicates which amongst NWDAFs are able to act as an aggregation point.

In an embodiment, the consumer NF autonomously determines how a plurality of NWDAFs operate together.

In an embodiment, the determination is based on selection criteria, whereby the consumer NF considers all NWDAFs identified by the NRF and based on the implemented selection criteria decides how to collect data from a combination of them.

In an embodiment, each of the plurality of NWDAFs pre-negotiates with one or more other Aggregator NWDAFs how many analytics IDs it supports and the Aggregator NWDAF advertises such extended set of supported analytics IDs within the NRF.

In an embodiment, further operations are provided a network function service consumer sends a discovery request to a Network Repository Function, NRF, including all required Analytics ID(s) and an area of interest, the NRF responding with one or more distributed NWDAF instance IDs, each covering a set of Analytics ID(s), and at least part of the area of interest supported, the network function service consumer sends a subscription request to each distributed NWDAF, each distributed NWDAF responds with analytics specific parameters per analytics ID, and per analytics ID, the network function service consumer itself aggregates the target of analytics reporting across distributed NWDAFs for corresponding areas of interest.

In an embodiment, further operations are provided a network function service consumer sends a discovery request to a Network Repository Function, NRF, including all required Analytics ID(s) and an area of interest, the NRF responding with one or more of a set of NWDAF instance IDs, each covering a set of Analytics ID(s), and at least part of the area of interest supported and AP ID, or other identifier, per Aggregator NWDAF instance(s) indicating possible aggregation point(s), the network function service consumer, based on its internal selection criteria, considering registered NWDAF capabilities and information from NRF, selects at least one NWDAF as Aggregator NWDAF, the network function service consumer sends a subscription request to Aggregator NWDAF to designate as an aggregation point, including Analytics IDs and area of interest per NWDAF to aggregate from, and either a) Aggregator NWDAF identifies its designation as aggregation point, or b) Aggregator NWDAF based on configuration, implementation or queries to NRF decides on mapping to specific NWDAFs to aggregate analytics, Aggregator NWDAF subscribes to all NWDAFs, NWDAFs notify with analytics specific parameters per analytics ID in the set of Analytics IDs, Per analytics ID, Aggregator NWDAF aggregates the target of analytics reporting across different NWDAFs for corresponding area of interest, and Aggregator NWDAF notifies to the network function service consumer with analytics specific parameters per analytics ID for all aggregated analytics IDs per NWDAF.

In an embodiment, further operations are provided a network function service consumer sends a discovery request to a Network Repository Function, NRF, including all required Analytics ID(s) and an area of interest, the NRF responding with one or more of at least one NWDAF instance ID, at least one NWDAF instance ID to be aggregated into at least one Aggregator NWDAF instance ID as registered in NRF, the network function service consumer subscribing to all NWDAFs, including aggregation points acting as central NWDAFs and receiving individual notifications, and per analytics ID, the network function service consumer aggregating analytics data from both distributed and (semi-)centralized NWDAF instances for corresponding points of interest.

In accordance with an aspect of the disclosure, a telecommunication network operable to perform the method of the first aspect is provided.

A single instance or multiple instances of NWDAF 40 may be deployed in a Public land mobile network (PLMN). In case multiple NWDAF 40 instances are deployed, embodiments of the disclosure support deploying the NWDAF 40 as a central NF, as a collection of distributed NFs, or as a combination of both (i.e. some centralized and some distributed).

When multiple NWDAFs exist, not all of them need to be able to provide the same type of analytics results. In other words, some of them can be specialized so to provide certain types of analytics only, and some may be more general in nature. Embodiments of the disclosure define an Analytics ID information element, which is used to identify the type of supported analytics that a particular NWDAF can generate.

On the other hand, some of the NWDAFs in one network may be providing the same type of analytics, and so may assist each other for e.g. specific analytics for specific target User Equipment (UEs) or specific analytics for specific area of interest.

The capabilities of a particular NWDAF instance are described in the NWDAF profile stored in the Network Repository Function (NRF).

In cases where multiple instances of NWDAF are deployed, some specializing in providing certain type of analytics, or in order for multiple NWDAFs to help each other to provide the same type analytics, a coordination mechanism is defined across the instances. More importantly, a consumer Network Function (NF) may need a flexible data collection mechanism and associated services, once it discovers corresponding NWDAF instances, to realize different deployment options (whether distributed, centralized or a mixture of the two).

Embodiments of the disclosure provide a data collection mechanism in an environment comprising multiple NWDAFs to thereby flexibly support different deployment options.

In accordance with another aspect of the disclosure, an apparatus and method as set forth in the appended claims is provided. Other features of the disclosure will be apparent from the dependent claims, and the description which follows.

Although a few preferred embodiments of the disclosure have been shown and described, it will be appreciated by those skilled in the art that various changes and modifications might be made without departing from the scope of the disclosure, as defined in the appended claims.

Throughout the embodiments of this disclosure, the terms "NWDAF" and "NWDAF instance" are used interchangeably.

In an embodiment of the disclosure for distributed data collection, a consumer NF decides on the set of NWDAFs (or NWDAF instances) from which to collect data, based on its implemented selection criteria (e.g. the level of load per NWDAF, number of analytics IDs directly supported per NWDAF or other Key Performance Indicators (KPIs) preconfigured by the network Operator).

In an embodiment of the disclosure for (semi-)centralized data collection, a novel aggregation point identifier (AP ID) is defined per NWDAF indicating which other NWDAF can be a potential aggregation point for it. The identifier can be set, taking into account multiple factors including the level of load per NWDAF (or NWDAF instance), number of analytics IDs directly supported per NWDAF or other KPIs set by the network operator. NWDAF information maintained in NRF or any other designated Data Repository structures may hold this identifier per NWDAF. The consumer NF utilizes the AP ID as assistance information in addition to its other implemented selection criteria to decide on how multiple NWDAF instances collaborate.

In an alternative embodiment of the disclosure for (semi-)centralized data collection, a consumer NF intelligently decides how multiple NWDAF instances collaborate without any other entities' intervention. The consumer NF considers all NWDAF instances (e.g. as discovered via NRF) and based on implemented selection criteria, similar to distributed data collection, decides how to collect data from a combination of them. NWDAF information maintained in NRF or any other designated Data Repository structures can be agnostic to aggregation information.

In an alternative embodiment of the disclosure for (semi-)centralized data collection, each NWDAF instance pre-negotiates the number of analytics IDs it may support (either directly or indirectly) with other NWDAF instances (e.g. via NRF discovery) and it advertises such extended set of supporting analytics IDs (direct plus indirect ones) within NRF. NWDAF information maintained in NRF or any other designated Data Repository structures may explicitly differentiate directly supported analytics IDs from indirect ones. The consumer NF utilizes the direct versus indirect supporting analytics IDs as assistance information in addition to its other implemented selection criteria to decide how multiple NWDAF instances collaborate.

In an embodiment of the disclosure for mixed mode data collection, a combination of embodiments for distributed and (semi-)centralized data collection is adopted by the consumer NF.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

Figure 2:
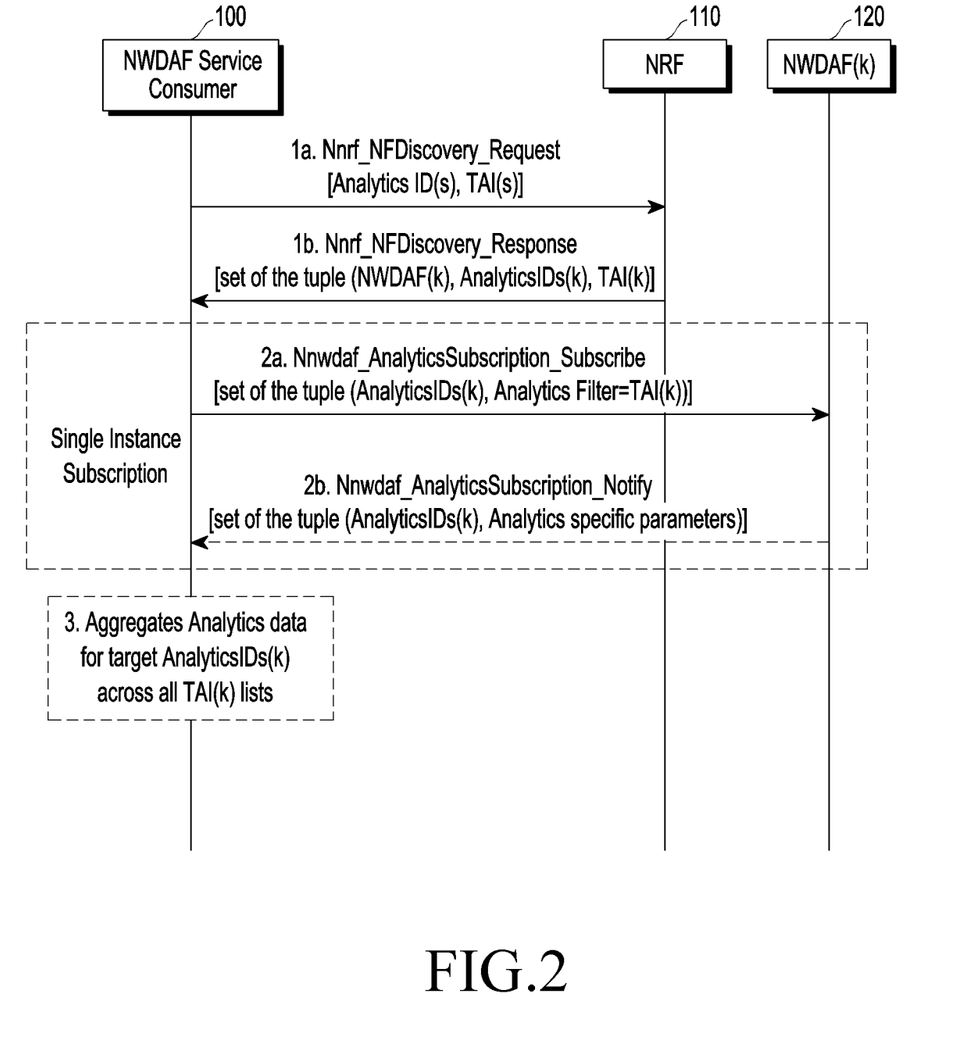
FIG. 2 illustrates a message exchange and method according to an embodiment of the disclosure.

FIG. 2 illustrates a scenario where there is a consumer NF, NRF, NWDAF(k) forming at least part of a system according to an embodiment of the disclosure. This also shows the various processes and messaging between respective elements.

Referring to FIG. 2, it is assumed that index (k) shows the NWDAF instance ID in a multi-instance deployment. Each instance NWDAF(k) 120 is specialized in a set of data analytics types, identified by AnalyticsIDs(k); some overlapping across different instances and some are mutually exclusive. Instances with overlapping analytic IDs may help each other e.g. to cover different sets of UEs as the target of analytics reporting or to cover different set of Tracking Areas within the area of interest. Tracking Area Indicators—TAI (k) refers to such areas of interest that could be covered by NWDAF(k).

Case A: Distributed Data Collection Model

In a first embodiment of the disclosure, the Consumer NF 100, based on its implemented selection criteria, e.g. network configuration or pre-configured network operator's preference, may decide to consume different NWDAFs' services in a distributed manner.

The details of each operation shown in FIG. 2 are as follows:

1. NWDAF service consumer 100 sends NF discovery request (1a) to NRF 110 including all required Analytics ID(s) and the area of interest (e.g. in form of TAIs). The request may also include extra information, e.g. Network Slice Selection Assistance Information (i.e. Single-NSSAI or S-NSSAI). The NRF 110 response (1b) may include multiple NWDAF instance IDs, NWDAF(k), each covering a set of Analytics ID(s), AnalyticsIDs(k), and (part of) the area of interest supported by instance (k), identified as TAI(k).

2. NWDAF service consumer 100 sends a subscription request (2a) to each NWDAF(k) 120 including AnalyticsIDs (k) and TAI(k) (e.g. as Analytics Filter). The request can be as the set of tuple of (AnalyticsIDs(k), Analytics Filter=TAI (k)) as shown in operation 2a to differentiate the area of interest per analytics ID. NWDAF(k) 120 notifies with analytics specific parameters per analytics ID as shown in operation 2b.

3. The service consumer NF 100 may aggregate the target of analytics reporting across NWDAF(k)s for AnalyticsIDs (k) for corresponding areas of interest TAI(k).

Case B: (Semi-) Centralized Data Collection Model with AP ID

Figure 3:
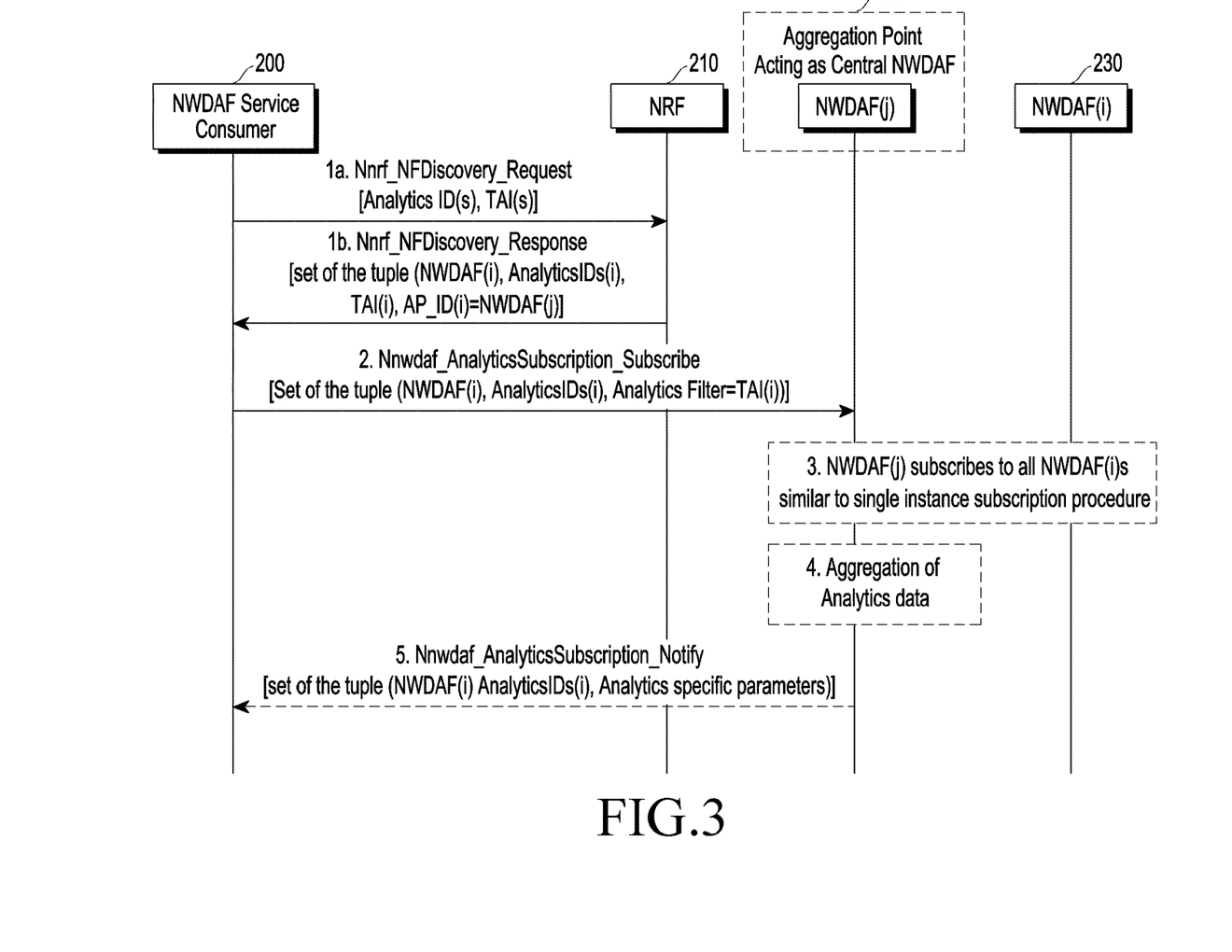
FIG. 3 illustrates a message exchange and method according to an embodiment of the disclosure.

FIG. 3 illustrates a scenario where there is a consumer NF, NRF, NWDAF(j) and NWDAF(i) forming at least part of a system according to an embodiment of the disclosure.

Referring to FIG. 3, the Consumer NF 200 based on AP ID as assistance information in addition to its implemented selection criteria decides to consume different NWDAFs' services in a (semi-)centralized manner, designating one (set of) NWDAF(s) as aggregation point(s).

In this case, when registering an aggregation point like NWDAF (j) 220 into NRF 210 in addition to the set of analytics IDs to be supported by NWDAF (j) 220 and area of interest to be covered by NWDAF (j) 220, the AP ID is also configured equivalent to NWDAF(j) 220 ID. This also identifies NWDAF(j) 220 as an aggregation point.

When registering a distributed NWDAF like NWDAF(i) 230 within NRF 210, in addition to the set of analytics IDs to be supported by NWDAF(i) 230 and the area of interest to covered by NWDAF(i) 230, the AP ID is also configured equivalent to one of NWDAF(j)s 220 already registered as aggregation points.

The mapping between NWDAF(j)s 220 and NWDAF(i)s 230 in AP IDs can take into account multiple factors including the level of load per NWDAF, analytics IDs supported per NWDAF, area of interest supported per NWDAF, any predefined hierarchy for mapping or other KPIs set by the network operator. NWDAF information maintained in NRF 210 or any other designated Data Repository structures may hold this mapping between NWDAFs based on AP IDs. In case B, both NRF 210 and NWDAF service consumer 200 become aware of the mapping between central and distributed NWDAFs based on AP IDs.

FIG. 3 illustrates a scenario where there is a consumer NF, NRF, NWDAF(j) and NWDAF(i) forming at least part of a system according to an embodiment of the disclosure. The details of each operation shown in FIG. 3 are as follows:

1. Similar to operation 1 of case A shown in FIG. 2 (distributed deployment), except the NRF 210 response may include both distributed NWDAF(i)s and central NWDAF (j)s. The NRF 210 response also includes the AP ID per NWDAF(i) 230 instance indicating possible aggregation point(s) NWDAF(j) 220 for different values of (j) i.e. the mapping between central and distributed NWDAFs. NWDAF service consumer 200 determines central aggregation points based on the mapping received from NRF 210 as AP IDs.

2. NWDAF service consumer 200 sends a subscription request to NWDAF(j) 220 (to designate it as an aggregation point) including AnalyticsIDs(i), TAI(i) (as analytics filter) for NWDAF(i) 230. NWDAF(j) 220 identifies its designation as aggregation point being the addressee of service consumer request. Alternatively, another explicit flag or parameter can be set as an input parameter by NWDAF service consumer 200 to explicitly designate an aggregation point, NWDAF(j) 220.

3. NWDAF(j) 220 subscribes to all NWDAF(i)s 230 in a similar procedure as case A (single instance subscription procedure). All NWDAF(i)s notify with analytics specific parameters per analytics ID in the set of AnalyticsIDs(i).

4. NWDAF(j) 220 may aggregate the target of analytics reporting across different NWDAF(i)s 230 for AnalyticsIDs (i) for corresponding area of interest, TAI(i).

5. NWDAF(j) 220 notifies with analytics specific parameters per analytics ID for all aggregated analytics IDs per NWDAF(i) 230.

Case C: (Semi-) Centralized Data Collection Model without AP ID

In an alternative embodiment of the disclosure, similar to case B, operation 1 is exactly similar to case A (distributed deployment) where the data kept in NRF 210 or any other data repository structure stays agnostic to deployment information (i.e. aggregation point identifiers). As a result, the NWDAF service consumer 200 decides on aggregation point(s) without any other assistance information.

In another case of centralized aggregation (termed here as case C), no mapping is indicated between central and distributed NWDAFs at NRF 210. In this case, no AP ID is configured for NWDAFs and only aggregation points are differentiated when registering in NRF 210 either implicitly (refer to case D, which follows) or explicitly e.g. by configuring an identifier. In case C, NRF 210 becomes agnostic to the mapping between central and distributed NWDAFs.

The details of each operation are as follows:

1. Similar to operation 1 of case A shown in FIG. 2, except NRF 210 response may include both distributed NWDAF (i)s 230 and NWDAF (j)s 220 identified as aggregation points. NWDAF service consumer 200 determines central aggregation point(s) based on its configuration or implemented selection criteria.

2-5. are as above described for case B.

Case D: (Semi-) Centralized Data Collection Model, Pre-Negotiated

In an alternative embodiment of the disclosure similar to case B, operation 1 is similar to case A (distributed deployment) except in respect of the data kept within NRF 210 or any other data repository structure, the AnalyticsIDs(j) advertised by NWDAF(j) 220 is an extended set of analytics IDs from different NWDAF(i)s 230 that can be pre-negotiated for instance j, e.g. based on some configurations or a pre-defined hierarchy when each NWDAF registers within NRF 210. As a result, no explicit identifier is defined per NWDAF within NRF 210, unlike case B and no mapping is indicated between central and distributed NWDAFs at NRF 210.

The extended set of analytics IDs supported can be differentiated from analytics IDs directly supported per NWDAF. Some central NWDAFs may only aggregate analytics so the extended list may not have directly supported analytics in such a situation. Consequently, the NWDAF service consumer 200 may utilize this information in addition to its implemented selection criteria to decide on how multiple NWDAFs collaborate (e.g. the NWDAF(s) supporting more analytics IDs directly can be preferred to extend their list to avoid extra signaling overhead or network latency).

The details of each operation are as follows:

1. Similar to operation 1 of case A shown in FIG. 2, except NRF 210 response may include both distributed NWDAF (i)s 230 and NWDAF (j)s 220 identified as aggregation points. NWDAF service consumer 200 determines central aggregation point based on its implemented selection criteria.

2. NWDAF service consumer sends subscription request to NWDAF(j) 220 (to designate as aggregation point) including all Analytics IDs, TAIs needed without indicating any mapping per NWDAF (i)s 230.

3. NWDAF (j) 220 based on extended set of supporting analytics IDs and also configuration, implementation or queries to NRF 210, decides on mapping to specific distributed NWDAFs to aggregate analytics from and subscribes to them.

4. NWDAF(j) 220 may aggregate the target of analytics reporting across different NWDAF(i)s 230 for Analytics IDs(i) for corresponding area of interest.

5. NWDAF (j) 220 notifies with analytics specific parameters per analytics ID for all aggregated analytics IDs without indicating any mapping per NWDAF(i)s 230.

Case D1: (Semi-) Centralized Data Collection Model, Mapping at Central NWDAFs

In another case of centralized aggregation (referred to here as case D1, as a sub-case of Case D), no mapping is indicated between central and distributed NWDAFs at NRF 210 similar to case D. In this option also, no AP ID configured and only aggregation points are differentiated when registering in NRF 210 either implicitly (again similar to case D) or explicitly e.g. by configuring an identifier. Furthermore, in addition to NRF 210, NWDAF service consumer 200 also becomes agnostic to the mapping between central and distributed NWDAFs. Instead, each central NWDAF 220 based on configuration, implementation or queries to NRF 210 or a pre-defined hierarchy (when registers to NRF) decides on mapping to specific distributed NWDAFs.

The details of each operation are as follows:

1. Similar to operation 1 of case A shown in FIG. 2, except NRF 210 response may include both distributed NWDAF (i)s 230 and NWDAF (j)s 220 identified as aggregation points. NWDAF service consumer 200 chooses central aggregation points.

2. NWDAF service consumer sends subscription request to NWDAF(j) 220 (to designate as aggregation point) including all Analytics IDs, TAIs needed without indicating any mapping of analytics IDs or TAIs per NWDAF (i) 230.

3. NWDAF (j) 220 based on configuration, implementation or queries to NRF 210 decides on mapping to specific distributed NWDAFs 230 to aggregate analytics from and accordingly subscribes to them.

4. NWDAF(j) 220 may aggregate the target of analytics reporting across different NWDAF(i)s 230 for Analytics IDs(i) for corresponding areas of interest.

5. NWDAF (j) 220 notifies with analytics specific parameters per analytics ID for all aggregated analytics IDs without indicating any mapping of analytics IDs or TAIs per NWDAF (i) 230.

Case E: Mixed Mode Data Collection Model

In third embodiment of the disclosure, a mixture of distributed and (semi-) centralized modes of deployment can be used.

Figure 4:
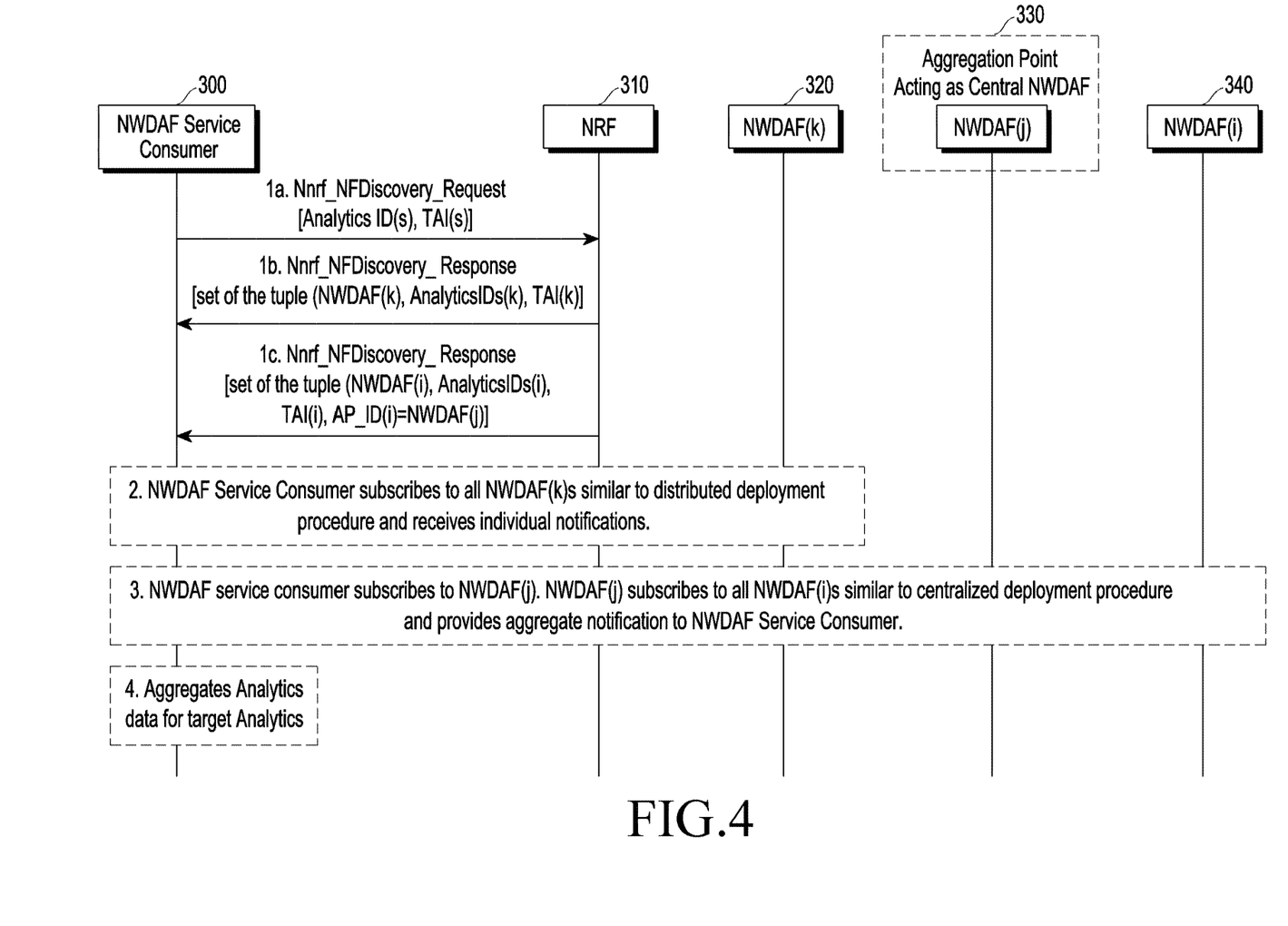
FIG. 4 illustrates a message exchange and method according to an embodiment of the disclosure.

FIG. 4 illustrates a scenario where there is a consumer NF, NRF, NWDAF(k), NWDAF(j) and NWDAF(i) forming at least part of a system according to an embodiment of the disclosure.

Referring to FIG. 4, the details of each operation are as follows:

1. NWDAF service consumer 300 sends NF discovery request (1a) to NRF 310 including all required Analytics ID(s) and the area of interest (e.g. in form of TAIs). The request may also include extra information, e.g. Network Slice Selection Assistance Information (i.e. Single-NSSAI or S-NSSAI). NRF response may include (1b) a (set of) NWDAF instance ID(s), i.e. NWDAF(k) 320, deployed in distributed manner. NRF 310 response may also include (1c) a (set of) NWDAF instance ID(s) (i.e. NWDAF(i) 340) to be aggregated in a (set of) NWDAF instance IDs (i.e. NWDAF (j) 330).

2. NWDAF service consumer 300 subscribes to all NWDAF(k)s 320 similar to the distributed deployment procedure in case A and receives individual notifications.

3. NWDAF service consumer 300 also subscribes to NWDAF(j) 330. NWDAF(j) 330 subscribes to all relevant NWDAF(i)s 340 to be aggregated similar to the (semi-) centralized deployment procedure in cases B or C or D or D1 and provides aggregate notification to the NWDAF service consumer 300.

4. The NWDAF service consumer 300 aggregates analytics data from both distributed and (semi-)centralized NWDAF instances.

Figure 5:
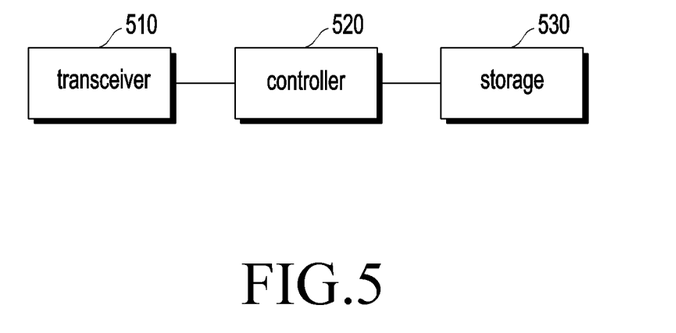
FIG. 5 is a block diagram of a network entity according to an embodiment of the disclosure.

FIG. 5 is a block diagram of a network entity according to an embodiment of the disclosure. The network entity may correspond to each of the network entities shown in FIGS. 1-4. For example, the network entity may refer to each of the network functions (e.g. NRF, NWDAF) shown in FIG. 1-4.

Referring to FIG. 5, the network entity may include a transceiver 510, a controller 520, and storage 530. In the present disclosure, the controller 520 may include a circuit, an ASIC, or at least one processor.

The transceiver 510 may transmit and receive signals to and from a terminal or another network entity.

The controller 520 may control the overall operation of the network entity according to an embodiment. For example, the controller 520 may control the signal flow to perform the operations in FIGS. 1-4 described above. For example, the control unit 520 may determining how analytics data from a plurality of individual sources is collected and analyzed.

The storage 530 may store at least one of information exchanged through the transceiver 510 and information generated by the controller 530.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a consumer network function (NF) entity in a telecommunication network, the method comprising:
   transmitting, to a network repository function (NRF) entity, a discovery request;
   receiving, from the NRF entity, a discovery response comprising information for at least one network data analytics function (NWDAF) entity based on the discovery request;
   selecting an aggregator NWDAF entity from the at least one NWDAF entity, based on analytics aggregation capability information of the at least one NWDAF entity;
   transmitting, to the selected aggregator NWDAF entity, a subscription request comprising an analytics identifier (ID) and information for an area of interest; and
   receiving, from the selected aggregator NWDAF entity, a notification comprising aggregated analytics for the analytics ID.

2. The method of claim 1, wherein the aggregator NWDAF entity is configured to aggregate analytics for the analytics ID, received from other NWDAF entities associated with the area of interest.

3. The method of claim 1, wherein the analytics aggregation capability information of the at least one NWDAF entity is stored in the NRF entity.

4. The method of claim 2, wherein the aggregator NWDAF entity is configured to:
   determine the other NWDAF entities to aggregate analytics, based on configuration or queries to the NRF entity;
   transmit a subscription request to the determined other NWDAF entities; and
   receive a notification comprising the analytics for the analytics ID from the other NWDAF entities.

5. A consumer network function (NF) entity, the consumer NF entity comprising:
   a transceiver; and
   a controller configured to:
      transmit, to a network repository function (NRF) entity, a discovery request,
      receive, from the NRF entity, a discovery response comprising information for at least one network data analytics function (NWDAF) entity based on the discovery request,
      select an aggregator NWDAF entity from the at least one NWDAF entity, based on analytics aggregation capability information of the at least one NWDAF entity,
      transmit, to the selected aggregator NWDAF entity, a subscription request comprising an analytics identifier (ID) and information for an area of interest, and
      receive, from the selected aggregator NWDAF entity, a notification comprising aggregated analytics for the analytics ID.

6. The consumer NF entity of claim 5, wherein the controller is further configured to aggregate analytics from other NWDAF entities for the requested analytics ID for the area of interest.

7. The consumer NF entity of claim 5, wherein the analytics aggregation capability information of the at least one NWDAF entity is stored in the NRF entity.

8. A method performed by an aggregator network data analytics function (NWDAF) entity in a telecommunication network, the method comprising:
   receiving, from a consumer network function (NF) entity, a first subscription request comprising an analytics identifier (ID) and information for an area of interest;
   determining one or more other NWDAF entities to aggregate analytics, based on configuration or queries to a network repository function (NRF) entity;
   transmitting, to the determined one or more other NWDAF entities, a second subscription request for the analytics ID;
   receiving, from the determined one or more other NWDAF entities, a second notification comprising an analytics for the analytics ID;
   aggregating the analytics for the analytics ID; and transmitting, to the consumer NF entity, a first notification comprising the aggregated analytics for the analytics ID.

9. An aggregator network data analytics function (NWDAF) entity managing analytics data in a telecommunication network, the aggregator NWDAF entity comprising:

a transceiver; and a controller configured to:
receive, from a consumer network function (NF) entity, a first subscription request comprising an analytics identifier (ID) and information for an area of interest,
determine one or more other NWDAF entities to aggregate analytics, based on configuration or queries to a network repository function (NRF) entity,
transmit, to the determined one or more other NWDAF entities, a second subscription request for the analytics ID,
receive, from the determined one or more other NWDAF entities, a second notification comprising an analytics for the analytics ID,
aggregate the analytics for the analytics ID, and
transmit, to the consumer NF entity, a first notification comprising the aggregated analytics for the analytics ID.

* * * * *